March 21, 1967 B. D. GREENSHIELDS 3,309,794
DRIVER TRAINING APPARATUS
Filed Dec. 9, 1963 3 Sheets-Sheet 1
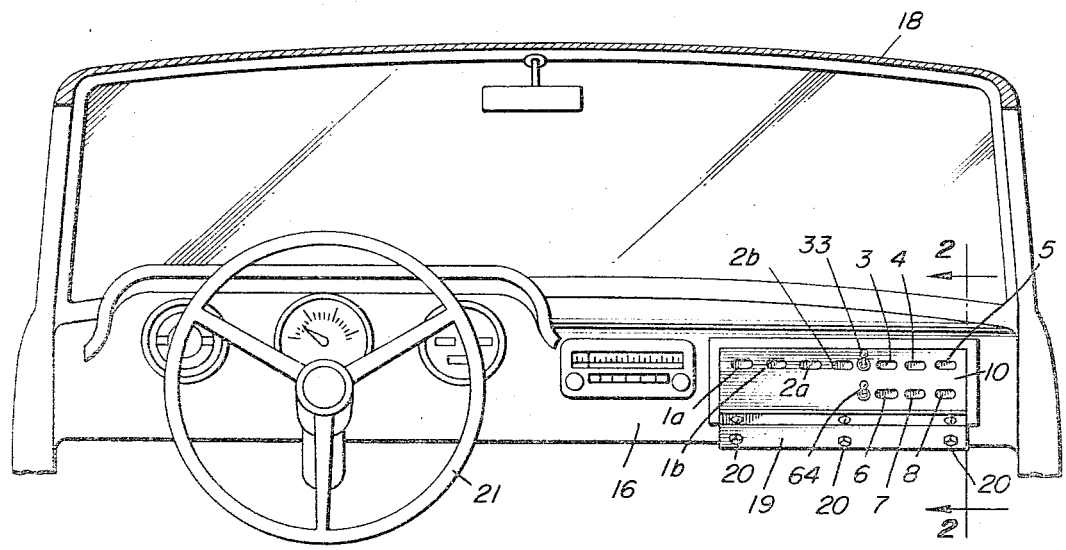
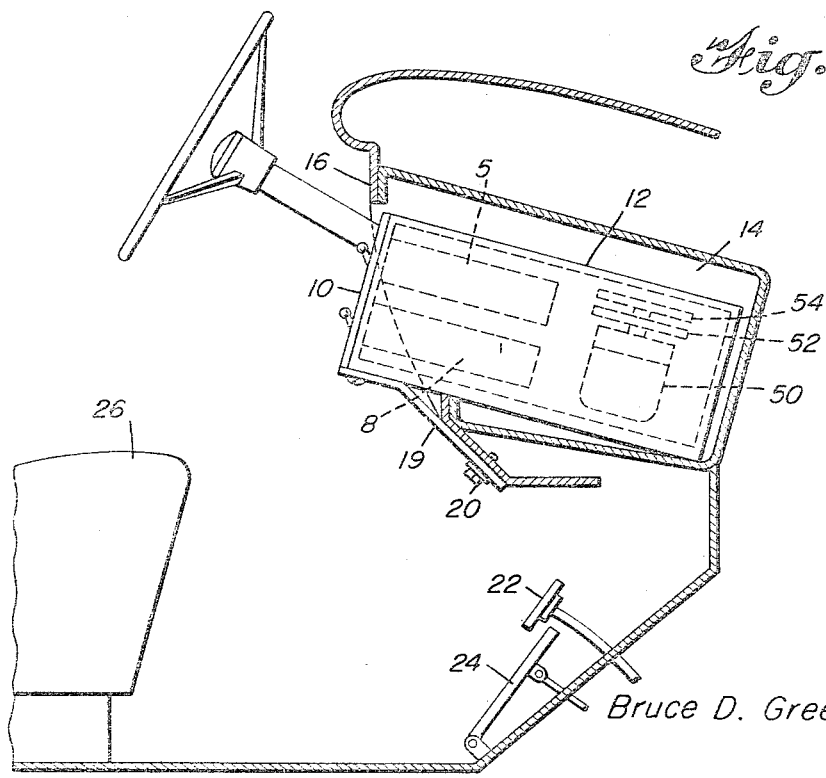
INVENTOR
Bruce D. Greenshields
BY Lane, Aitken, Dunner & Ziems
ATTORNEYS

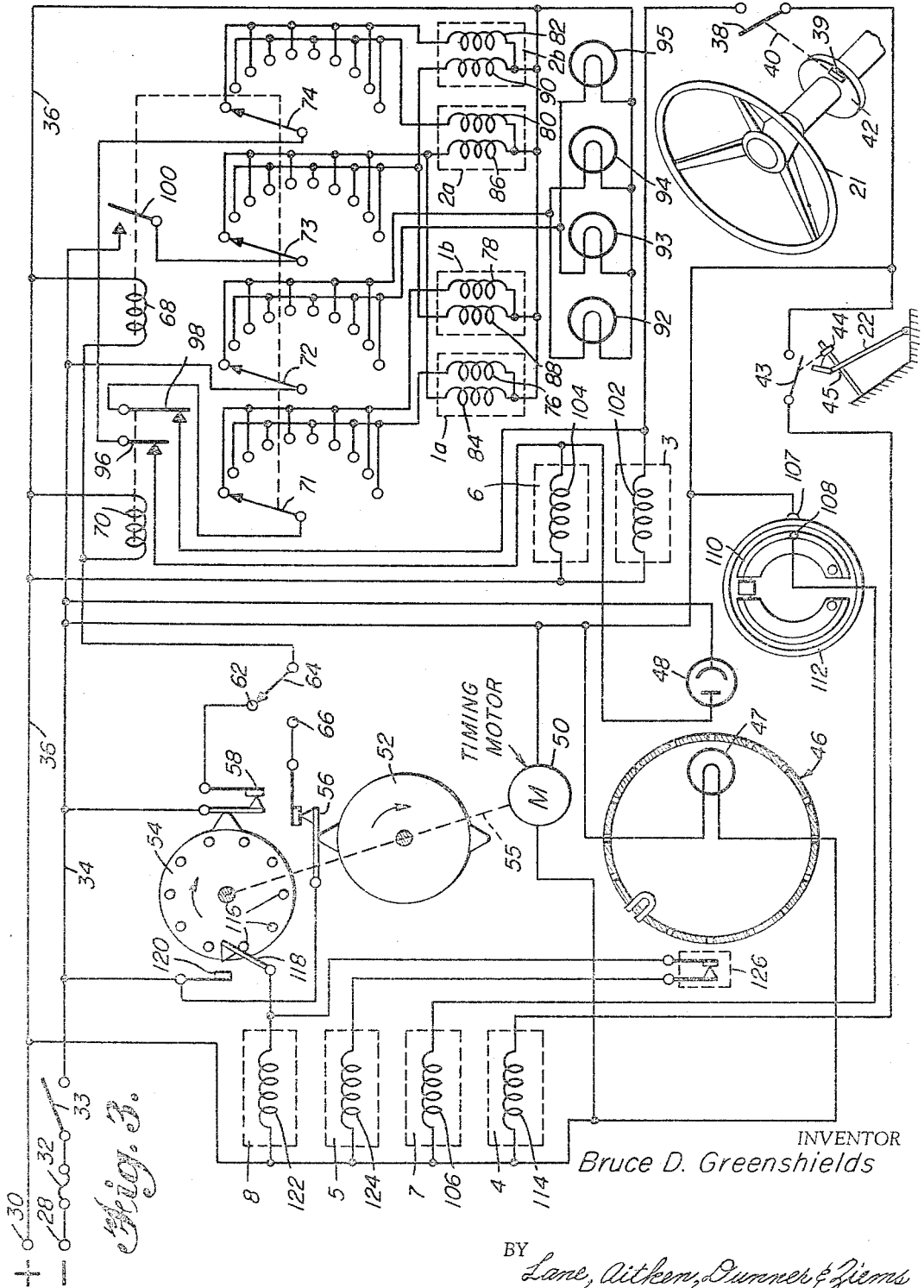

March 21, 1967  B. D. GREENSHIELDS  3,309,794
DRIVER TRAINING APPARATUS

Filed Dec. 9, 1963  3 Sheets-Sheet 3

INVENTOR
Bruce D. Greenshields

BY Lane, Aitken, Dunner & Ziems
ATTORNEYS

3,309,794
DRIVER TRAINING APPARATUS
Bruce D. Greenshields, 1025 Arbordale,
Ann Arbor, Mich. 48103
Filed Dec. 9, 1963, Ser. No. 329,037
16 Claims. (Cl. 35—11)

This invention relates to driving training apparatus and more particularly, it concerns an apparatus adapted to be mounted in an automotive vehicle or used in conjunction with a vehicle simulator to measure and record driver actions during the operation of various vehicle controls.

In a co-pending application Serial No. 153,346 filed November 20, 1961, by the present inventor, and entitled, "Method and Apparatus for Recording Traffic and/or Driver Behavior," abandoned in favor of a continuation application Ser. No. 365,863, filed May 5, 1964, there is disclosed a technique for recording traffic and/or driver behavior by travelling a route along which information relative to traffic and/or driver behavior is desired and simultaneously recording in digital units, the characteristics of travel reflected by driver behavior and/or driver behavior together with the occurrence of events effecting such behavior. The apparatus disclosed therein takes the form of the chassis which may be mounted in an automobile or other such vehicle having steering and speed control means and included in the chassis is a panel on which a plurality of counters are mounted so as to be exposed to a suitable recording means such as a camera. The camera, in turn, is arranged to photograph the numbers registered on the counters at predetermined intervals of time, or distance travelled to record various characteristics directly as digital units. Certain of the counters are associated with means for sensing various movements of the vehicle and thus reflecting characteristic traffic conditions such as unit changes in vehicle speed and direction, numbers of changes in vehicle direction and speed, time units during which the vehicle is travelling, distance travelled and the like. Other of the counters employed in the invention disclosed in the aforementioned co-pending application are arranged to be actuated by manual switches under the control of a timing mechanism by which these other counters are actuated one per each unit of time that the switch is closed, the switch representing an event that might have an effect either on traffic or driver behavior. Also, certain others of the counters are arranged to be actuated by movements of the vehicle control means by the driver, such as for example, movements of the accelerator, brake and steering wheel. In this manner, each of the counters registers cumulatively in digital units, the various movements, events and the like which occur during the travel of the vehicle over the route.

The present invention involves the application of some of the basic concepts underlying the invention disclosed in the aforesaid co-pending application, but is an improvement over the apparatus thereof, particularly in its application to the field of driver training. Hence, in the present invention, a plurality of counters are again employed to register in digital units the cumulative total of items having a direct bearing on the manner in which a driver exercises control over a vehicle or vehicle simulator so as to provide in directly usable terms, a measure of the driver's ability. In this instance, however, the apparatus is adapted to be mounted in a driver training vehicle, for example, in such a manner that the cumulative counts registered on the counters are made available to an observer or instructor seated in the vehicle continuously as the driver actions counted are performed. More specifically, the counters are arranged to be mounted on the dashboard of a conventional automobile by inserting the chassis on which they are mounted into the glove compartment of the automobile and further, means are provided by which the counts of major control actions exercised by the driver are totalled and the totals retained for observation periodically by an instructor, for example, during the operation of the vehicle.

The major control actions referred to are those driver actions which bear directly on the driver's ability to maneuver the vehicle under a given set of circumstances. To illustrate, it has been established that the driving task may be divided into three basic parts; i.e., (1) tracking—keeping the vehicle centered in its proper lane; (2) speed control—maintaining a proper and desired velocity; and (3) positioning—maintaining proper space relationships between the vehicle and other elements of traffic. It has been found that a driver's ability to track a vehicle properly is directly correlated to the number of steering wheel reversals employed to direct a vehicle in the desired path. Correspondingly, ability to maintain a proper and desired velocity is directly correlated to the number of speed changes undergone by the driven vehicle during its travel over a predetermined route or path. Since positioning is determined by tracking and speed control ability, measurements of steering wheel reversals and speed changes, therefore, also indicate the driver's degree of coordination in maintaining proper positioning of the vehicle with respect to the roadway, other vehicles, cyclists, pedestrians and the like. Moreover, an additional refinement in the measurement of driver ability is available in view of the discovery that steering wheel reversal rate is a basic stabilizing signal to the driver with respect to speed control of the vehicle. For example, it has been found that each driver has a steering wheel reversal rate that affords him with a comfortable feeling while driving. Accordingly, when his reversal rate is high, the driver will tend to slow down. On the other hand, if his reversal rate falls below his "comfort" level, he will tend to speed up as he attempts to regain his normal rate. In accordance with this analysis of driver behavior, the present invention provides an extremely accurate measurement of driver efficiency during the operation of a vehicle by affording an observation of the number of steering wheel reversals and the number of speed changes that occur during predetermined short intervals of time while the vehicles are in operation.

Accordingly, a principal object of the present invention is to provide an improved apparatus for use in measuring and evaluating driver efficiency during the operation of an automotive vehicle or an automotive vehicle simulator.

Another object of this invention is to provide an apparatus of the type referred to which is readily adaptable to a conventional automobile substantially without modification thereof and by which an observer or instructor seated next to the driver is continuously afforded with a current record of driver behavior.

A further object of this invention is the provision of an apparatus of the type referred to which affords an up-to-the-minute measurement of driver efficiency as well as a measurement of control movements exercised by a driver during the operation of a vehicle for a predetermined period of time.

Another object of this invention is to provide an apparatus of the type referred to which registers the cumulative total of driver actions executed during the performance of a "test" together with the cumulative total of unit time intervals during which the vehicle is in operation and during which the vehicle is moving, the registered actions and time intervals all being presented in digital form to facilitate direct computation of a rating of driver efficiency.

A still further object of this invention is the provision of a unique arrangement of counter pairs including means for energizing one of the pair during a time interval of predetermined duration while holding the count registered on the other counter of the pair during a preceding time interval, the idle counters being resettable to zero at the end of the interval to permit cyclic operation automatically.

Still other objects and further scope of applicability of the present invention will be had from the detailed description to follow, taken in conjunction with the accompanying drawings in which:

FIG. 1 is a fragmentary view of the front interior of an automotive vehicle illustrating the registering portion of the apparatus of this invention;

FIG. 2 is an enlarged fragmentary cross section taken along line 2—2 of FIG. 1;

FIG. 3 is a circuit diagram incorporating schematic representations of the actuating components of the present invention;

Figure 4:
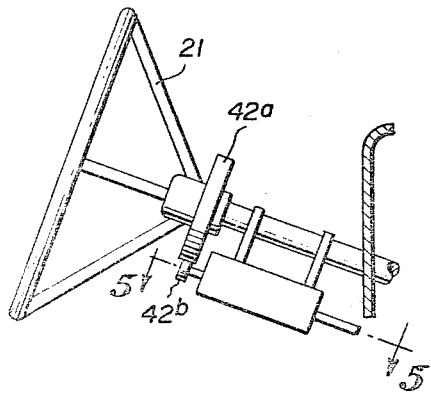
FIG. 4 is a fragmentary side elevation illustrating one arrangement for sensing steering wheel reversals.

As shown in FIGS. 1 and 2, the apparatus of this invention includes a plurality of counters $1a$, $1b$, $2a$, $2b$, 3, 4, 5, 6, 7 and 8 displayed from a front panel 10 of a chassis 12 adapted to be received in a glove compartment 14 situated in the dashboard 16 of a conventional automobile 18. The chassis 12 is provided with a bracket having an angularly disposed depending portion 19 secured to the lower edge of the dashboard by suitable means such as screw bolts 20. The automobile 18 is conventional in all respects and, therefore, includes the usual control elements such as a steering wheel 21, a brake pedal 22 and an accelerator pedal 24, all of which controls are adapted to be manipulated by a driver situated in the front seat 26. Also in accordance with the conventional practice where an automobile is employed for driver-training purposes, the front seat 26 is a two-place seat to effect a driver's seat behind the wheel and an instructor's seat to the right of the driver's seat. It will be apparent, therefore, that the panel 10, from which the counters 1–8 are displayed when positioned in the glove compartment 14 as above indicated, will be presented directly in front of the instructor's seat as thus defined. Further, it will be appreciated that while the apparatus of this invention has particular utility when so mounted in the glove compartment of a conventional automobile, it may be adapted to other specific environments. For example, it will be readily apparent that the counters 1–8 could be displayed to an instructor or an observer in an arrangement involving a vehicle simulator wherein the student driver or driver under observation is situated behind controls simulating the conventional automotive vehicle controls referred to above.

An important feature of the present invention resides in the manner by which the counters $1a$, $1b$, $2a$ and $2b$ are actuated to provide an indication of the rate at which steering wheel reversals and unit speed changes occur during the operation of a vehicle of the like by a student driver or other driver under observation. This indication is afforded by energizing the counters $1a$ and $2a$ for example during a predetermined time interval such as one minute or one half minute to count cumulatively steering reversals and unit speed changes respectively occurring during that time interval. At the end of the minute or half minute, counters $1b$ and $2b$ are energized whereas the totals registered on counters $1a$ and $2a$ are held during the selected time interval to facilitate the reading thereof by the instructor or observer. At the end of the interval, the totals registered and retained on the counters $1a$ and $2a$ are reset to zero and the cycle repeated so that a current, minute-by-minute count is available in this manner. A more complete understanding of this feature and the means by which it is accomplished may be had by reference to FIG. 3 of the drawing.

Figure 5:
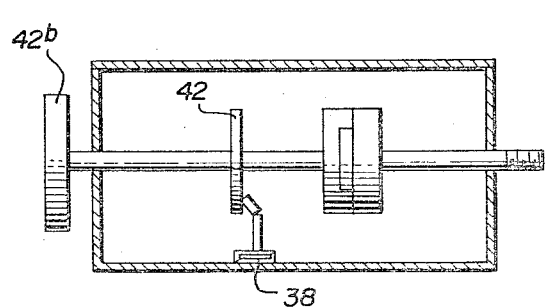
FIG. 5 is an enlarged partial cross-section taken on line 5—5 of FIG. 4.
Figure 6:
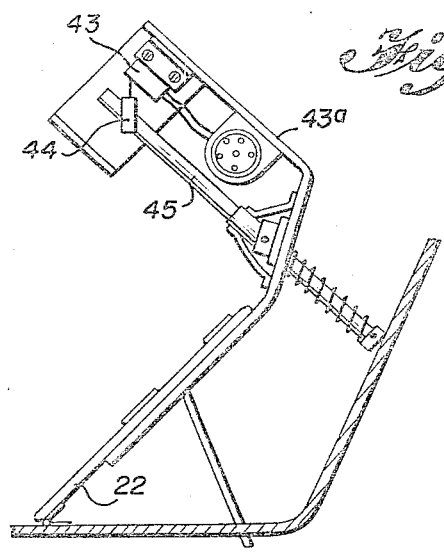
FIG. 6 is a fragmentary side elevation showing a form of accelerator pedal movement sensing device usable with this invention.

As shown in FIG. 3, a pair of terminals 28 and 30 are connected by suitable means (not shown) to a source of power such as a 12-volt battery of the type employed in conventional automotive vehicles. Preferably, a fuse 32 and main power switch 33 are associated with one of the terminals, in this instance the terminal 28, and a power line 34 connected to the switch 33. Another power line 36 is connected to the terminal 30. As in co-pending application, Serial No. 153,346, abandoned, filed November 20, 1961, the means for generating a signal or a pulse corresponding to each count to be registered on the respective counters 1 to 8 generally involves the closure of a circuit across the lines 34 and 36. Moreover, the control sensing devices employed with this invention by themselves may be identical to those disclosed in the aforesaid co-pending application. Hence, as shown in FIGS. 3–5 of the drawings, and to afford a pulse or a signal corresponding to steering wheel reversals, a switch 38 is conncected with a wiper 40, the wiper making frictional engagement with a surface on a disc 42 movable directly with the steering wheel 21 through friction gearing $42a$ and $42b$. In this manner, the switch 38 is closed once during each steering wheel reversal. Similarly, as shown in FIGS. 3 and 6, movements of the accelerator pedal 22 or more specifically reversals thereof are sensed by a switch 43 supported on a pedal mounted bracket $43a$ and having a wiper element 44 in turn making frictional engagement with a plunger 45 held immovable relative to the pedal 22 by being spring biased into engagement with the vehicle floor board. To provide a signal corresponding to each unit change in vehicle speed, a rotatable skirt 46 having alternately opaque and transparent portions representing unit speed changes is associated with a conventional speedometer again as specifically described in the aforesaid co-pending application. In this manner, an incandescent lamp 47 positioned behind the skirt 46 and connected across the power lines 34 and 36 will be effective to energize a photocell 48 each time a transparent portion registers with the path of light to the photocell. Other specific types of sensing devices are contemplated. For example, in place of the photoelectric sensor for detecting unit speed changes, the speedometer cable may be operatively connected to a magnetic bar rotatable therefor to angular positions corresponding to speed. A plurality of stationary magnetic reed switches arranged annularly to be opened or closed by indexing of the bar therewith would provide a pulse for each unit change in speed assuming one such switch for each unit of speed change such as 2 miles per hour.

To afford means by which the counters 1 and 2 may be operated in the manner mentioned above, a timer is employed and comprises a substantially constant speed motor 50 connected across the lines 34 and 36 and operative upon closing the switch 33 to drive cams 52 and 54 by way of a mechanical transmission depicted schematically by the dashed lines 55. Although two cams are illustrated in FIG. 3 primarily for purposes of clarity, it will be appreciated by those skilled in the art that a single rotary cam having the desired arrangement of camming lugs may be employed without departing in the least from the spirit and scope of the present invention. The gear reduction between the motor 50 and the cams 52 and 54 is such that each of the cams 52 and 54 will make one revolution per minute. The cam 52 operates to close a switch 56 twice every revolution or once every thirty seconds. The cam 54 operates to close a switch 58 once every revolution or once every minute. The switch 58 connects one side of the power source applied on conductor 34 to a contact 62 of a single-pole, double-throw switch 64, whereas the switch 56 is connected between the conductor 34 and a contact 66 of the switch 64. In one position, the pole of the switch 64 will engage the contact 62 and in the other position it will engage the contact 66. The stepping coil 68 of a stepping switch is connected between the pole of the switch 64 and the other side of the power source applied on conductor 36. The coil of a relay 70 is also connected between the pole of the switch 64 and the conductor 36. When it is desired to operate on half minute intervals, the pole of the switch 64 will be positioned to engage the contact 66 and when it is desired to operate on one minute intervals the pole of the switch 64 will be positioned to engage the contact 62. Therefore, when the pole 64 engages the contact 62 the stepping coil 68 will be connected across the source of power each time the switch 58 closes and thus the stepping switch will advance its contacts when positioned at the end of each one minute interval. Correspondingly, when the switch 64 is in engagement with the contact 66, the coil 68 of the stepping switch will be connected across the source of power applied between conductors 34 and 36 each time the switch 56 closes to advance the stepping switch contacts one position at the end of each half minute interval.

The stepping switch in the form shown has four arms 71, 72, 73 and 74 which advance one position each time the coil 68 is energized. Each of the arms 71–74 has ten positions and engages a different contact in each position. The arms are shown in FIG. 3 to be in the first position and upon the energization of the coil 68, the arms will move to the second position in accordance with conventional stepping switch operation. Each successive energization of the coil 68 will cause the arms 71 to 74 to advance to the next successive position until the arms reach the tenth position. Similarly, in conventional fashion, the next successive energization of the coil 68 after the arms 71–74 reach the tenth position will cause the arms 71–74 to step back again to the first position. The means by which the stepping switch described above effects operation of the counters 1a, 1b, 2a and 2b will now be described. It will be noted that the contact engaged by the arm 71 in the even positions, that is, the second, fourth, sixth, eighth and tenth positions are connected to one side of an advancing coil 76. The other side of the advancing coil 76 is connected to the conductor 36. The contacts engaged by the arm 71 in the odd positions of the arm 71, that is, the first, third, fifth, seventh and ninth positions are connected to one side of an advancing coil 78, the other side of the coil 78 being connected to the conductor 36. The contacts engaged by the arm 74 in the even positions thereof are connected to one side of an advancing coil 80 and the contacts engaged in the odd positions by the arm 74 are connected to one side of an advancing coil 82. The other side of the advancing coils 80 and 82 are connected to the conductor 36. Each of the advancing coils 76, 78, 80 and 82 is operatively connected to counters 1a, 1b, 2a and 2b, respectively. Accordingly, each time the advancing coil of one of these counters is energized, it increases the count registered on that counter by one unit.

The contacts engaged by the arm 73 in its odd positions are connected to one side of reset coils 84 and 86 associated with the counters 1a and 2a. The other side of the reset coils 84 and 86 is connected to the conductor 36. The contacts engaged by the arm 73 in its even positions are connected to one side of reset coils 88 and 90 of the counters 1b and 2b, the other side of these coils also being connected to the conductor 36. When one of the reset coils of the counters 1a, 1b, 2a or 2b is energized it will reset such counter back to zero.

Incandescent lamps 92, 93, 94 and 95 are provided to illuminate the counters 1a, 1b, 2a and 2b respectively. In practice, each of these lamps are mounted behind the panel 10 adjacent the exposed face portion of the respective counters. The lamps 92 and 94 are connected between the contacts engaged by the arm 72 in its odd positions and the lamps 93 and 95 are connected between the conductor 36 and the contacts engaged by the arm 72 in its even positions. The arm 72 is connected directly to the conductor 34 so that the lamps 92 and 94 will be connected across the source of power applied between conductors 34 and 36 whenever the arms 71–74 are in their odd positions and the lamps 93 and 95 will be connected across the source of power whenever the arms 71–74 are in their even positions. Thus the counters 1a and 2a will be illuminated by the lamps 92 and 94 only when the arms 71–74 are in their odd positions and the counters 1b and 2b will be illuminated by the lamps 93 and 95 only when the arms 71–74 are in their even positions. The switch 38 which closes each time the steering wheel reverses direction connects the conductor 34 over a normally closed contact 97 of the relay 70 to the arm 71. As a result, each time the switch 38 closes and the arm 71 is in one of its even positions, the advancing coil 76 of the relay 1a will be energized. Thus the counter 1a will count the number of closures of the switch 38 and correspondingly, reversals of the steering wheel 21 when the arms 71–74 are in their even positions. Whenever the arms 71–74 are in their odd positions, the advancing coil 78 of the counter 1b will be energized each time the switch 38 closes to count the number of reversals of the steering wheel. The arm 74 is connected over a normally closed contact 96 of the relay 70 and the photocell 48 of the unit speed change detector to the conductor 34. When the arm 74 is in its even position, the advancing coil 80 of the switch 2a will be energized each time the photocell conducts and the advancing coil 82 will be energized when the arm 74 is in one of its odd positions each time the photocell conducts. Thus the counter 2a will count the units of speed change when the arms 71–74 are in their even positions and the counter 2b will count the units of speed change when the arms 71–74 are in their odd positions.

Each time the stepping coil 68 of the stepping switch is energized, in an instant before advancing the arms 71–74 one position, it also closes a normally open switch 100 which connects the arm 73 to the conductor 34. If the arms 71–74 are in one of their odd positions, the reset coil 84 and 86 of the counters 1a and 2a are connected to the switch 100 by way of the arm 73. Then upon energization of the coil 68 but slightly before the arms are advanced from the odd to even positions, the switch 100 is closed to energize the reset coils 84 and 86 and reset the counters 1a and 1b. Then, upon advance of the arms to their even positions the advancing coils 76 and 90 of the counters 1a and 1b are energized to operate in the manner described. Similarly, slightly before the arms 71–74 are advanced to one of their even positions the reset coils 88 and 90 of the counters 1b and 2b will be energized and reset these counters back to zero. Because of the normally opened switch 100 therefore, the counters are not reset until the end of the time interval following the one during which they were energized, thereby affording ample time for the counts registered thereon to be read and recorded.

Thus assuming the arms 71–74 are in the position shown in FIG. 3, the counters 1b and 2b will be energized to count the number of steering wheel reversals and units of speed change respectively. Then at the end of a thirty second or one minute interval depending upon the position of the switch 64, the relay 63 will be energized and advance the arms 71–74 to their second position. The counter 1a will begin to count the number of steering wheel reversals and the counter 2a will begin to count the number of units of speed change. Meanwhile, the counts registered by the counters 1b and 2b will be illuminated by the lamps 93 and 95 and give an indication of the number of steering wheel reversals and units of speed change counted during the preceding minute or half minute interval. When the steering coil 68 is again energized at the end of the next minute or half minute interval, the counters 1b and 2b will be reset to zero, the arms 71–74 will be advanced to their third position, whereupon the counters 1b and 2b will again commence to count the number of steering wheel reversals and units of speed change. Meanwhile the counters 1a and 2a will be illuminated, giving an indication of the number of steering wheel reversals and units of speed change during the preceding one minute or half minute time interval. At the end of the next time interval when the stepping coil 68 is again energized, the counters 1a and 2a will be set to zero, the arms 71–74 will be advanced to their fourth position, and again the counters 1a and 2a commence to count the number of steering wheel reversals and the number of units of speed change. The counters 1b and 2b will again be illuminated to indicate the number of steering wheel reversals and units of speed change during the preceding interval. The system will continue to operate in this manner with the counters 1a and 2a alternating with the counters 1b and 2b providing an indication of the preceding interval and counting during the present interval. Each time the relay 70 is energized it opens the normally closed contacts 96 and 98 to prevent the application of a pulse to the counters 1a, 1b, 2a, and 2b while the arms 71–74 being advanced from one position to another.

In addition to actuating the counters 1a through 2b in the manner described above, the signals generated by closure of the switch 38 and photocell 48 operate continuously to register a cumulative total of steering wheel reversals and unit speed changes on counters 3 and 6 respectively. This operation is effected by connecting an advancing coil 102 associated with the counter 3 between the power lines 34 and 36 by way of the switch 38. Similarly, an advancing coil 104, associated with the counter 6, is connected between the power leads by way of the photocell 48 as shown schematically in FIG. 3. To register the number of times the vehicle brakes is applied, and to present this registration to an observer seated beside the driver in the vehicle 18, the counter 7 is associated with an advancing coil 106 connected across the power lines 34 and 36 by way of the conventional automotive vehicle brake lighting system depicted schematically in FIG. 3 as a pair of terminals 107 and 108 adapted to make contact upon a brake shoe 110 making engagement with a brake drum 112. Similarly, the number of accelerator pedal reversals is counted on the counter 4 due to closure of the switch 43. Hence, as shown in FIG. 3 an advancing coil 114 associated with the counter 4 is connected across the power lines 34 and 36 once each time the switch 43 is closed.

To correlate the cumulative totals registered on the counters 3, 4, 6 and 7 with the time duration over which these totals were compiled, the counters 5 and 8 are arranged to account or register the time duration in terms of total unit time intervals during which the vehicle 18 is in motion and during which the vehicle is in operation respectively. To generate a pulse for each such unit time interval, the cam 54 is provided with a plurality of pins 116 adapted to contact and move the arm 118 of a switch against the stationary contact 120 thereof and thereby connect the arm with the power line. In the form shown, ten pins 116 are employed. Thus, it will be apparent that the arm 118 will engage the contact 120 and thus be connected with the line 34 each one-tenth of a minute or each 6 seconds since as above described, the cam 54 makes one complete revolution every minute. One side of an advancing coil 122 associated with the counter 8 is connected directly to the arm 118 whereas the other side of the coil is connected to the line 36. Therefore, and since the motor 50 of timer will be energized upon closure of the master switch 33, the counter 8 will count in the total number of six second intervals that occur during the time the switch 33 is closed. The advancing coil 124 is connected to the switch arm 118 by way of a normally closed switch 126 and at its other side to the power line 36. The switch 126 is adapted to be opened by a permanent magnet 128 carried by the speedometer skirt 46. The magnet 128 is so positioned on skirt 46 that when the speed of the vehicle 18 is zero, the magnet will become indexed with the contacts of the switch 126 to hold them in an open position and thereby interrupt the source of current to the advancing coil 124 of the counter 5.

The operation of the apparatus of this invention and its application to the field of driver training may now be understood. After a student driver has taken his place in the seat 26 behind the wheel 21 and an instructor on the seat to the driver's right, each of the counters 3–8 is manually reset to zero by a conventional reset device (not shown). Also, before the actual test is begun, the switch 33 should be closed to energize the timing cams so that the counters 1a, 1b, 2a and 2b will be allowed to run with the car stopped until they reset. After having adjusted the switch 64 to reset or alternate the counters 1a, 1b, 2a and 2b for either one half minute or a minute, a test is begun by driving a pre-established test route. While the driver is controlling the vehicle 18, each of the counters 1 through 8 will operate to provide a cumulative total in digital units of the driver's actions. Moreover, since the instructor is afforded with a minute-by-minute or half-minute-by-half-minute count of steering wheel reversals and speed changes, the illuminated ones of these counters are read and recorded while the test is in progress. In addition to merely recording the numbers appearing on the counters 1a through 2b, the instructor may make notes regarding various conditions that existed in the minute or half minute which the respective count was accumulated. To illustrate the significance of this feature, it has been demonstrated that when getting into close quarters, a driver instinctively increases his steering wheel reversal rate. Thus, if the reversal count was made during passage through an underpass, for example, the fact that the underpass existed should be noted by the instructor. Since the count is retained on the counters 1a through 2b for a full minute or half minute, ample time is afforded for the reading to be taken together with the making of the required notes. After the test is completed, the totals registered on the counters 3–8 will be recorded and affords the basis for such computations as average steering wheel reversals count per one-tenth of a minute of vehicle operation and/or per one-tenth of a minute of vehicle motion merely by dividing the counts registered on the counter 3 by the proper one of the counts registered on the counters 5 and 8. Similarly, other desirable information is obtainable without concern for units because of the digital form in which the registered totals are presented on the counters.

Thus, it will become apparent that the present invention provides an effective and highly valuable tool, particularly for use in the driver training field. The manner in which it affords an instructor with a completely objective evaluation of a driver's ability renders the apparatus of this invention particularly desirable not only in the field of driver training but also in other areas where a driver's ability is desired to be rated. Other applications of the apparatus are contemplated, such as for example, use with a driver simulator. In addition, the feature of the present invention by which the counters 1a through 2b are alternately energized and de-energized with provision for retaining the recorded total for a subsequent time interval will have application in other fields where it is desired to provide continuous operation of one component of a pair during successive time intervals while retaining the position of the other component of the pair until the completion of the interval.

Since many variations and specific forms of the present invention are possible it is to be distinctly understood that the foregoing description is illustrative only of preferred embodiments, not limiting the scope of the invention thereto, and that the true spirit and scope of the present invention is to be determined by reference to the appended claims.

The invention claimed is:

1. Apparatus for indicating driver behavior during the manipulation of vehicle controls comprising: means for sensing movement of at least one of the vehicle controls and for generating a signal corresponding to each such movement, a pair of digital counters adapted to register the cumulative total of signals generated by said sensing means, and means for activating one of said counters to register the cumulative total of signals occurring during a predetermined time interval and deactivating the other of said counters to retain the digital total registered thereon during a preceding time interval.

2. The apparatus recited in claim 1 including further, means for indicating the deactivated one of said counters.

3. The apparatus recited in claim 1 including means for cancelling the total registered on the deactivated one of said counters prior to the initiation of a succeeding time interval.

4. The apparatus recited in claim 1 including means for temporarily deactivating both of said counters during the instant at which they are activated and deactivated respectively.

5. Apparatus for indicating driver behavior during the operation of a vehicle having steering and speed controls, said apparatus comprising: first means to generate a signal for each steering control reversal, second means to generate a signal for each unit change in vehicle speed, a first pair of counters each adapted to be actuated by said first means to register cumulative totals of steering control reversals, a second pair of counters each adapted to be actuated by said second means to register cumulative totals of unit changes in vehicle speed, timing means for establishing successive time intervals of predetermined duration, means for energizing one of said counters in each of said pairs and de-energizing the other of said counters in each of said pairs during one of said time intervals, and means for cancelling the totals on said other counters near the end of said one time interval.

6. Apparatus for indicating driver behavior comprising in combination: an automotive vehicle having a driver's seat, an instructor's seat, a dashboard positioned in front of said seats, a steering wheel and speed control means; means for sensing steering wheel reversals; a pair of counters connected to said sensing means to register a cumulative count of steering wheel reversals; means for alternately activating and deactivating each of said counters to register and display respectively the total of steering wheel reversals during successive time intervals of predetermined duration; and means for mounting said counters on said dashboard in front of said instructor's seat.

7. The apparatus recited in claim 6 including further, means for sensing unit changes in vehicle speed, another pair of counters connected to said speed sensing means, and means for alternately activating and deactivating each of said other counters to register and display respectively the total of unit speed changes during said successive time intervals.

8. Apparatus for registering and indicating events occurring during each of successive time intervals comprising: a pair of registering devices each having read-out means, said devices being operative only when enabled, means for alternately enabling said devices in the successive time intervals, and means for resetting the read-out means of each device at the end of the time interval during which it is not enabled, whereby substantially the entire length of each successive time interval is available to read the events registered on said devices during the preceding time interval.

9. The apparatus recited in claim 8 wherein said registering devices are digital counters each having an advancing coil and a reset coil.

10. The apparatus recited in claim 9 in which said means for alternately enabling said counters in successive time intervals comprises stepping switch means having one set of terminals connected to one side of an electric circuit through said advancing coils and another set of terminals connected to said one side of the circuit through said reset coils, a first stepping contact engageable with the terminals of said one terminal set, a second stepping contact engageable with the terminals of said other terminal set, means for simultaneously advancing said stepping contacts to connect said first stepping contact to the advancing coil of one of said counters and to connect said second stepping contact with the reset coil of the other of said counters, said second stepping contact being connected to the other side of the circuit through a normally opened switch closeable by said advancing means slightly before said stepping contacts are advanced, and timer means for periodically energizing said advancing means.

11. Apparatus adapted to measure and record driver actions during the operation of an automotive vehicle having a steering wheel, an accelerator, and a brake pedal, said apparatus comprising: means for sensing steering wheel reversals, means for sensing accelerator reversals, means for sensing brake pedal depressions, timer means for generating a pulse once during each unit interval of time, a first pair of counters connected to said steering wheel reversal sensing means, means for activating one of said first counter pair to register the cumulative total of steering wheel reversals occurring during a predetermined time period and for deactivating the other of said first counter pair to retain the steering wheel reversal total registered thereon during a preceding similar time period, a second counter connected to said steering wheel reversal sensing means for registering the cumulative total of said steering wheel reversals occurring during the operation of the vehicle, a third counter connected to said accelerator sensing means to register the cumulative total of accelerator reversals during vehicle operation, a fourth counter connected to said brake pedal depression sensing means for registering the cumulative total of brake pedal depressions occurring during the operation of the vehicle and a fifth counter connected to said timer to register the cumulative total of unit time intervals during which the vehicle is in operation.

12. The apparatus recited in claim 11 including further, means for sensing unit changes in vehicle speed, a sixth pair of counters connected to said speed change sensing means, means for activating one of said sixth pair of counters to register the cumulative total of speed changes occurring during the predetermined period of time and for deactivating the other of said sixth pair of counters to retain the digital total registered thereon during a preceding period of time, and a seventh counter connected to said speed change sensing means to register the cumulative total of unit speed changes occurring during vehicle operation.

13. The apparatus recited in claim 12 including further, means connected to said unit speed change sensing means for sensing vehicular movement, and a seventh counter connected to said last-mentioned means and to said timer means to register the cumulative total of unit time intervals during which the vehicle is moving.

14. The apparatus recited in claim 13 including means for indicating the deactivated one of said first and sixth counter pairs.

15. The apparatus recited in claim 14 including means for varying the time period during which the counters in said first and sixth counter pairs are activated and deactivated.

16. The apparatus recited in claim 15 including a chassis for mounting all of said counters and displaying the totals registered thereon from a single panel, said chassis being mountable within clear view of one seated in the vehicle.

References Cited by the Examiner
UNITED STATES PATENTS
2,627,674  2/1953  Wilson _____ 35—11

OTHER REFERENCES

Platt, Traffic Safety Research, presented at the IV World Meeting of International Road Federation, Madrid, Oct. 14–20, 1962, pp. 10 and 11.

EUGENE R. CAPOZIO, *Primary Examiner.*

WALTER W. NIELSEN, R. E. KLEIN,
*Assistant Examiner.*